United States Patent [19]

Roberts et al.

[11] Patent Number: 5,407,175
[45] Date of Patent: Apr. 18, 1995

[54] FLOW VALVE HAVING ROTATABLE ANNULAR FLANGE

[75] Inventors: Robert D. Roberts, Cary; Joseph M. Federowicz, Apex, both of N.C.

[73] Assignee: Emco Wheaton, Inc., Cary, N.C.

[21] Appl. No.: 228,434

[22] Filed: Apr. 15, 1994

[51] Int. Cl.[6] .............................................. F16L 37/28
[52] U.S. Cl. .............................. 251/148; 137/614.06; 285/16; 285/414; 251/367
[58] Field of Search ................... 285/16, 12, 414, 906; 137/614.04, 614.06; 251/367, 148

[56] References Cited

U.S. PATENT DOCUMENTS

| | | | |
|---|---|---|---|
| 797,418 | 8/1905 | Everson . | |
| 846,704 | 3/1907 | Stucy . | |
| 3,407,847 | 10/1968 | Snyder | 137/614.06 |
| 3,479,005 | 11/1969 | DeGraaf | 137/614.06 |
| 3,768,840 | 10/1973 | Upton et al. | 285/16 |
| 5,000,492 | 3/1991 | Kemp . | |
| 5,273,071 | 12/1993 | Oberrecht | 137/614.06 |

Primary Examiner—A. Michael Chambers
Attorney, Agent, or Firm—Bell, Seltzer, Park & Gibson

[57] ABSTRACT

A flow valve for mating with a fluid coupling of the type comprising a cylindrical body and a plurality of circumferentially spaced latches. The flow valve comprises a generally cylindrical valve housing and an annular flange adjacent one end of the valve housing. The flange is mounted to the valve housing such that the flange is rotatable to facilitate repositioning of the flange to distribute wear on the flange caused by the circumferentially spaced latches of the fluid coupling. In a preferred embodiment, the flange is symmetric and the flange and the valve housing each comprise a predetermined pattern of holes for receiving fasteners for mounting the flange to the valve housing. After a period of use, the fasteners can be removed and the flange repositioned, or reversed, to distribute wear to other locations on the flange.

9 Claims, 8 Drawing Sheets

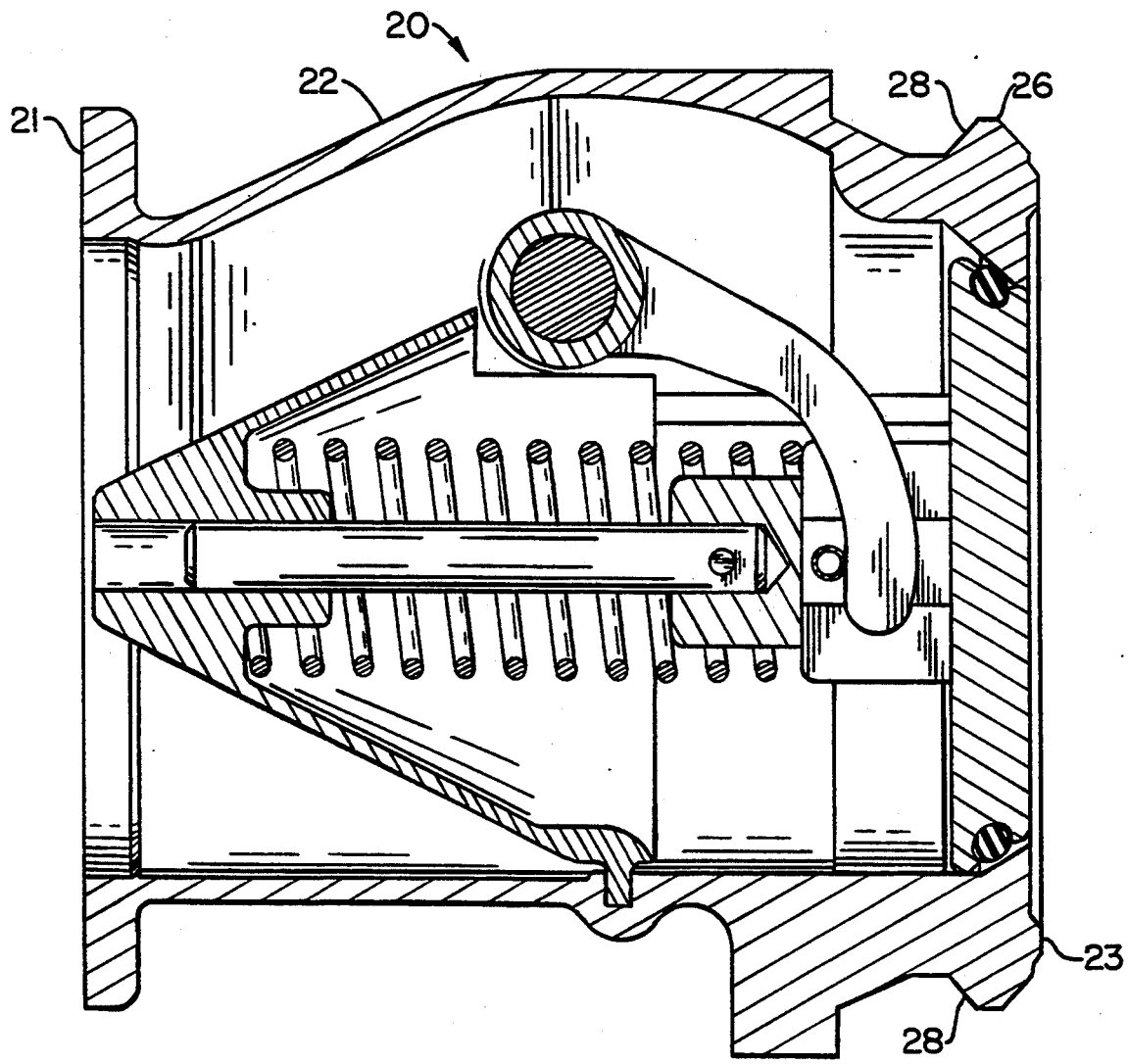
FIG. IA.
(PRIOR ART)

FLOW VALVE HAVING ROTATABLE ANNULAR FLANGE

FIELD OF THE INVENTION

The invention relates to a flow valve having a flange for juoining an adjacent pipe section to form a continuous fluid conduit. More particularly, the invention relates to a flow valve having a rotatable flange mating with a fluid coupling from a transfer hose for transferring fuel from a storage terminal to a tanker, or from a tanker to an underground storage tank.

BACKGROUND OF THE INVENTION

Flow valves are used in many applications which require the intermittent flow of fluid. Typical flow valves include a flange at one end for joining an adjacent pipe section to form a continuous fluid conduit. The flange provides a bearing surface mating the flow valve with the pipe section. The pipe section is generally joined to the flow valve in a semi-permanent manner, such as by welding or by bolting the pipe section to the flange of the flow valve.

U.S. Pat. No. 5,000,492 to Kemp discloses a bolting ring having a bearing surface for joining a flow valve and an adjacent pipe section to form a continuous fluid conduit. The ring includes a threaded portion and a smooth end portion on the inside diameter of the ring. The smooth end portion is smaller in diameter than the threaded portion and thereby defines a shoulder which serves as a mechanical stop for the flow valve. The cylindrical flow valve is threaded on its outside diameter and the ring is threaded over the valve up to the shoulder to ensure accurate positioning of the ring on the valve. The adjacent pipe section includes an integral bolting flange having longitudinal holes which are aligned with coaxial holes in the bolting ring. The holes receive double-sided threaded bolts and nuts for mechanically joining the flow valve and the pipe section. The bolting ring can be removed and replaced when the bearing surface on the ring is worn, but it cannot be repositioned to distribute wear and thereby extend the life of the bolting ring. Because the bolting flange of the adjacent pipe section is bolted to the bolting ring at a number of locations around the circumference of the ring, the flow valve and the pipe section cannot be quickly and easily disconnected in the field.

For many applications it is necessary that the flow valve and an adjacent pipe section be repeatedly connected and disconnected in the field. When the flow valve and the pipe section must be repeatedly connected and disconnected in the field, it is desirable that the pipe section and the flow valve be quickly and easily coupled and uncoupled. The process of repeatedly connecting and disconnecting the flow valve and the pipe section, however, presents a serious problem because the bearing surface on the flange of the flow valve becomes worn at the locations where the bearing surface mates with the adjacent pipe section. Excessive wear on the bearing surface results in a loose connection which may leak or suddenly disconnect. Therefore, it is important that the flow valve be replaced before a leak or a sudden disconnect has the opportunity to occur. Replacing the flow valve is especially important if use of the flow valve involves high pressure flow or the transfer of volatile liquids.

Flow valves are used to form a temporary continuous conduit for the intermittent transfer of fuel. For example, flow valves are used to join the transfer hose from a fuel storage terminal to the fill pipe of a tanker such that the tanker can be filled from the underneath instead of from the top. One end of the fill pipe is attached to the underside of the tanker while the opposite end is secured to the flow valve. The fluid conduit between the fuel storage terminal and the tanker is completed by mating the flange on the opposite end of the flow valve with a fluid coupling on the free end of the transfer hose from the storage terminal.

The flange is mated with the fluid coupling by a series of circumferentially spaced locking latches on the inside of the coupling which grip a bearing surface provided on the flange. Because the orientation of the flow valve relative to the fluid coupling is fixed, the latches grip the bearing surface at the same locations around the circumference of the flange each time the fluid conduit is formed. The repeated connecting and disconnecting of the flow valve and the fluid coupling causes excessive wear at the circumferential locations around the flange gripped by the latches, and thus necessitates the replacement of the flow valve at regular intervals.

A conventional cast aluminum flow valve for transferring fuel is shown in FIG. 1A. The flow valve 20 has a first end 21 and a second end 23. Flow valve 20 includes a one-piece generally cylindrical, hollow valve housing 22 which comprises an integrally formed annular flange 26 adjacent second end 23. Because flange 26 cannot be repositioned or removed, the entire flow valve 20 must be replaced when bearing surface 28 provided on flange 26 is worn. To prevent the possibility of a leak or sudden disconnect, the flow valve is replaced at regular intervals. Replacement of the entire flow valve, however, is not cost effective when only the bearing surface on the flange is worn because typically the service life of the valve and the valve housing far exceeds the useful life of the flange. Therefore, the useful life of the flange determines, and consequently reduces the service life of the flow valve.

One solution has been to construct the flow valve in two portions temporarily joined by a cylindrical retaining ring. A prior art flow valve of two-piece construction is shown in FIG. 1B. The flow valve 20' has a first end 21' and a second end 23'. Flow valve 21' includes a main valve housing portion 24 and a head valve housing portion 25. Main valve housing portion 24 comprises the valve and a portion of the valve housing structure, while head valve housing portion 25 comprises an annular flange 26' and the remaining valve housing structure. Head portion 25 is removable at retaining ring 27 and can be replaced, but not repositioned, when bearing surface 28' provided on flange 26' is worn. Although the two-piece construction of flow valve 20' improves cost effectiveness by increasing the service life of the flow valve, it introduces another significant problem.

In flow valve 20', the poppet valve seats itself against the seal 29 in head portion 25. Consequently, when head portion 25 and main portion 24 are separated, any fuel remaining in the fill pipe behind flow valve 20' is lost because the poppet valve is no longer seated against seal 29. In addition, removing and replacing head portion 25 of flow valve 20' in the field is time consuming, and if the replacement head portion is not properly connected, a fuel leak or a sudden disconnect can occur.

Accordingly, it is an object of the invention to improve the cost effectiveness of a flow valve by extending the service life of the valve.

It is another object of the invention to provide a flow valve which can be repeatedly mated with a fluid coupling without incurring excessive wear on the flange of the flow valve.

It is another object of the invention to reduce the possibility that a flow valve will leak or suddenly disconnect from a fluid coupling.

It is another object of the invention to provide a flow valve having an annular flange which can be rotationally repositioned to distribute wear on the flange caused by repeated mating with a fluid coupling.

It is another object of the invention to provide a flow valve having an annular flange which can be reversibly repositioned to distribute wear on the flange caused by repeated mating with a fluid coupling.

SUMMARY OF THE INVENTION

These objects, and others, are accomplished by the flow valve of the present invention. The invention is a flow valve having an annular flange for mating with a fluid coupling which is repeatedly connected and disconnected from the flow valve. The fluid coupling is of the type comprising a cylindrical, hollow body and a plurality of circumferentially spaced locking latches on the inside of one end of the body. The flow valve comprises a cylindrical, hollow valve housing having opposing ends. A valve is positioned within the valve housing for controlling the flow of fluid through the valve. At one end, the flow valve is secured to an adjacent pipe section, such as the fill pipe of a fuel tanker. At the other end, the valve housing is mounted to an annular flange which mates with the circumferentially spaced latches of the fluid coupling. The flange is mounted to the valve housing such that the flange can be repositioned to distribute wear on the flange caused by the circumferentially spaced latches of the fluid coupling, and to thereby extend the life of the flow valve.

In one embodiment, the flange comprises a predetermined symmetric pattern of longitudinal, circumferentially spaced holes. The valve housing comprises a matching pattern of coaxial threaded recesses. Fastening means, such as threaded bolts, are used to attach the annular flange to the valve housing through the holes. After repeated connecting and disconnecting, the flange is rotated one or more positions around the pattern of holes so as to present an unworn bearing surface to the fluid coupling and thereby distribute wear on the flange caused by the circumferential latches. In this embodiment, the flange may also be longitudinally symmetric such that identical bearing surfaces are provided on both sides of the flange. Thus, the flange is reversible to further distribute wear and extend the life of the flow valve.

In another embodiment, the valve housing comprises a threaded portion on its outside diameter adjacent the flange end and the annular flange comprises a matching threaded portion on its inner surface. The flange is threaded onto the valve housing until there is enough thread remaining for at least one full revolution of the flange on the valve housing. The position of the flange is then locked in rotational and axial relation to the valve housing by fastening means, such as a threaded set screw. The set screw passes through a radial hole in the flange which is generally perpendicular to the axis of the flow valve, and engages a centrally located channel in the threaded portion of the valve housing. After repeated connecting and disconnecting, the flange is threaded farther onto the valve housing so as to present an unworn bearing surface to the fluid coupling and thereby distribute wear on the flange caused by the circumferential latches. The set screw is then passed through the radial hole in the flange to engage a different circumferential location in the centrally located channel to again lock the flange in rotational relation to the valve housing. In this embodiment, the flange may also be longitudinally symmetric such that identical bearing surfaces are provided on both sides of the flange. Thus, the flange can be threaded onto the valve housing in the reverse direction to further distribute wear and extend the life of the flow valve.

In another embodiment, the valve housing comprises a circumferential channel adjacent the flange end and the annular flange comprises a plurality of arcuate-shaped circumferential portions. Each circumferential portion comprises a circumferential channel on its outer surface such that when the circumferential portions are positioned around the valve housing they form the annular flange. The circumferential portions are positioned around the valve housing in the circumferential channel adjacent the flange end and are retained together by fastening means, such as a spiral lock ring, which engage the continuous circumferential channel formed in the flange. In this manner, the flange is mounted to the valve housing, but rotates freely. After repeated connecting and disconnecting, the flange can be rotated relative to the valve housing so as to present an unworn bearing surface to the fluid coupling and thereby distribute wear on the flange caused by the circumferential latches. In this embodiment, the flange may also be longitudinally symmetric, such that identical bearing surfaces are provided on both sides of the flange. Thus, the flange is reversible to further distribute wear and extend the life of the flow valve.

In another embodiment, the valve housing comprises a continuous circumferential channel on its outer surface adjacent the flange end. The annular flange comprises a matching continuous circumferential channel on its inside surface. Fastening means, such as a spiral lock ring, are received in the channel of the flange. Using a special tool, the flange and the spiral lock ring are placed around the valve housing with the spiral lock ring positioned in the common channel formed by the channels in the flange and the valve housing. In this manner, the flange is mounted to the valve housing, but rotates freely. After repeated connecting and disconnecting, the flange can be rotated relative to the valve housing so as to present an unworn bearing surface to the fluid coupling and thereby distribute wear on the flange caused by the circumferential latches. In this embodiment, however, the flange is not removable, and thus is not reversible to further distribute wear.

Because the flow valve of the invention includes a flange which is rotatable relative to the valve housing, and in some cases reversible, wear on the bearing surface of the flange is distributed. Thus, the flow valve is cost effective to maintain and the life of the flow valve is extended. In addition, because wear at any single location around the circumference of the annular flange is reduced, the possibility of a leak or a sudden disconnect due to excessive wear is reduced, thereby ensuring the integrity of the connection throughout the service life of the flow valve.

BRIEF DESCRIPTION OF THE DRAWINGS

While some of the objects and advantages of the invention have been stated, others will become apparent as the preferred embodiments of the invention are described and considered in connection with the drawings, in which:

FIG. 1A is a longitudinal sectional view of a prior art flow valve;

DETAILED DESCRIPTION OF THE PREFERRED EMBODIMENTS

Figure 1B:
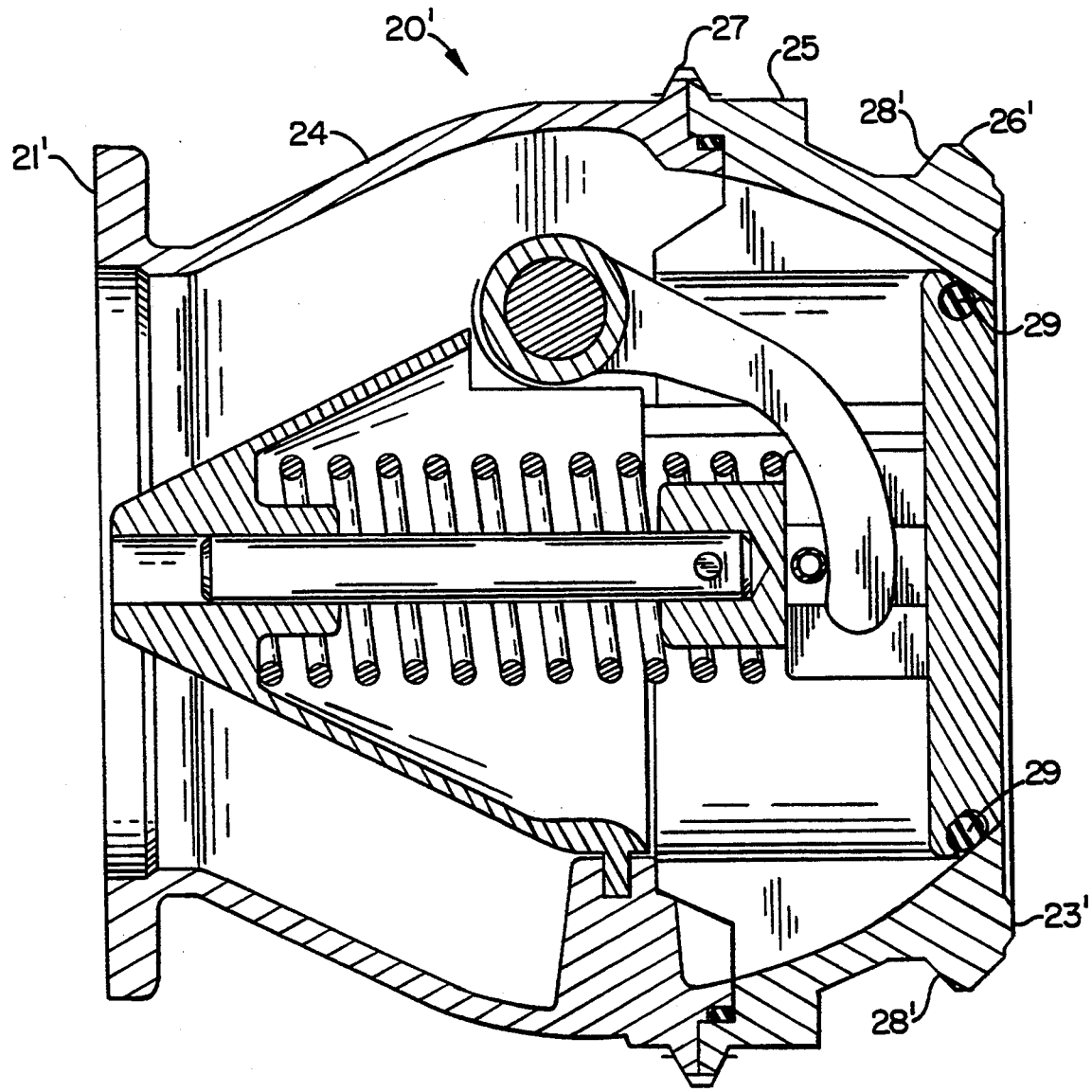
FIG. 1B is a longitudinal sectional view of another prior art flow valve.
Figure 2:
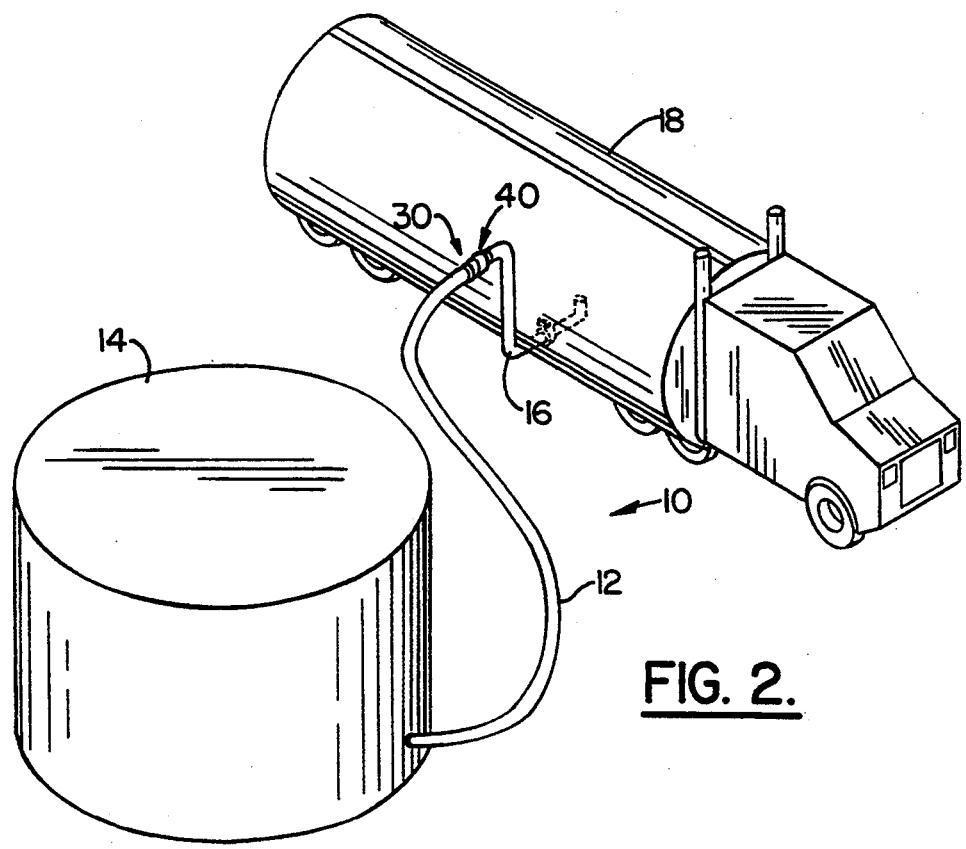
FIG. 2 is a perspective view illustrating the flow valve of the invention mating with a fluid coupling to form a continuous fuel conduit for transferring fuel from a fuel storage terminal to a fuel tanker.

Referring to FIGS. 2-9 which illustrate preferred embodiments of the invention, a flow valve according to the invention is generally indicated at 40. FIG. 2 schematically illustrates a continuous fuel transfer conduit 10 formed by joining one end of flow valve 40 to a flexible fuel transfer hose 12 from a fuel storage terminal 14, and the other end to a rigid fill pipe 16 from a fuel tanker 18. Thus, fill pipe 16 from tanker 18, flow valve 40, fluid coupling 30 and fuel transfer hose 12 from storage terminal 14 form a continuous conduit for transferring fuel.

Figure 3A:
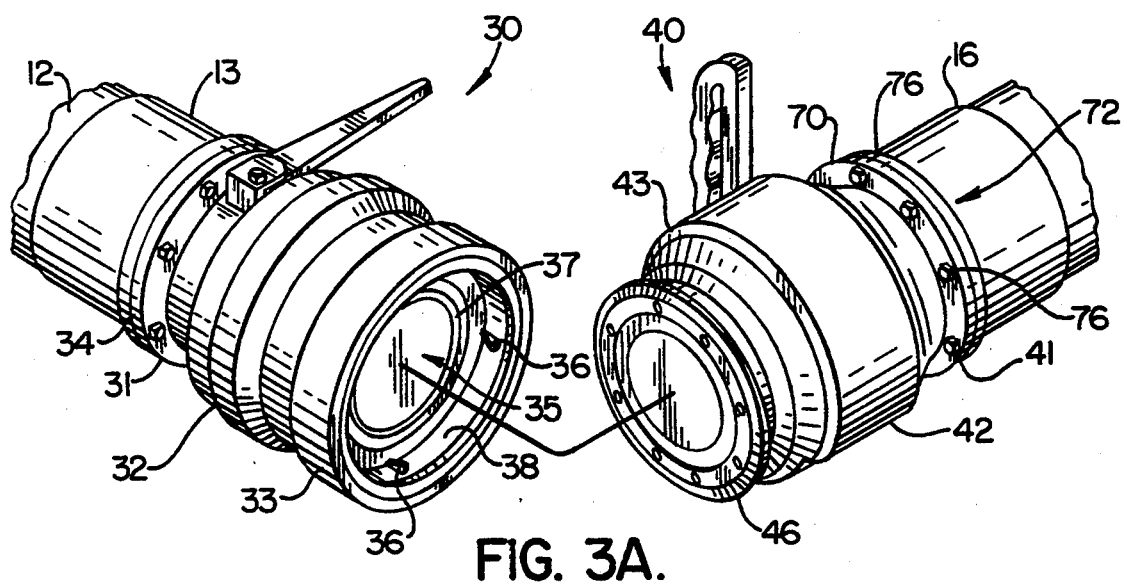
FIG. 3A is an exploded perspective view showing circumferentially spaced locking latches on the inside surface of the fluid coupling mating with the annular flange of the flow valve of FIG. 2 to form a continuous conduit which can be repeatedly connected and disconnected.
Figure 3B:
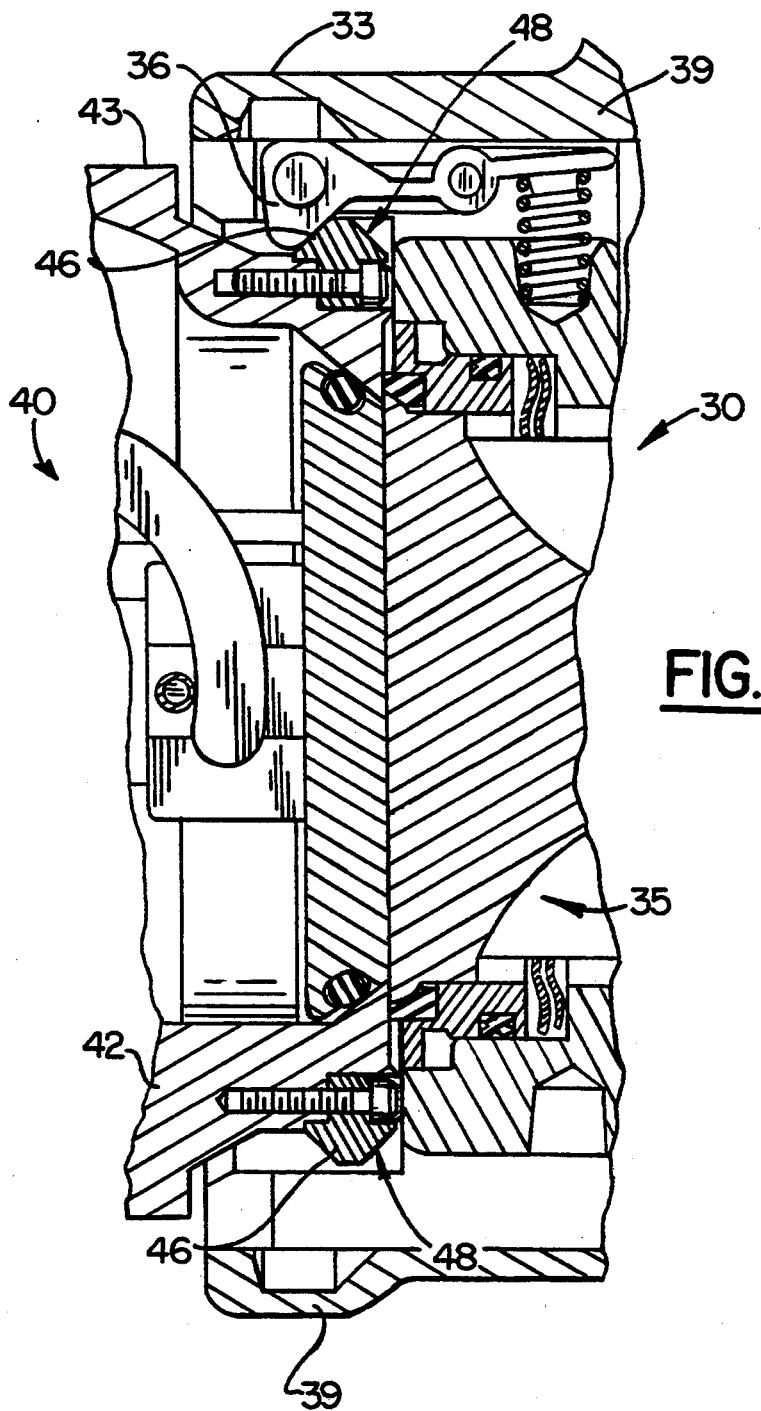
FIG. 3B is a longitudinal sectional view showing the latches of the fluid coupling of FIG. 3A mating with the bearing surface provided on the annular flange of the flow valve of FIG. 2.

As seen more clearly in FIGS. 3A and 3B, an annular flange 46 adjacent one end of flow valve 40 mates with a removable fluid coupling 30 secured to free end 13 of transfer hose 12. Fluid coupling 30 comprises locking latches 36 so that fluid coupling 30 and flow valve 40 may be repeatedly connected and disconnected in the field for intermittent fuel transfer operations. Although FIG. 2 illustrates the transfer of fuel from storage terminal 14 to tanker 18, flow valve 40 may also be utilized to transfer fuel from tanker 18 to an underground storage tank (not shown) at, for example, a fuel service station. Likewise, flow valve 40 is suitable for use in any application which involves the transfer of fluid through a continuous conduit. Ideally, of course, flow valve 40 is used in conjunction with a quick-release type coupling having a plurality of locking latches which repeatedly mate with an annular flange on the flow valve at predetermined locations around the circumference of the flange.

As best shown in FIGS. 3A and 3B, flow valve 40 comprises a generally cylindrical, hollow valve housing 42 having a first end 41 and a second end 43. Fill pipe 16 is secured to flow valve 40 at first end 41 by any means well known in the art. For example, fill pipe 16 may be bolted or permanently welded to first end 41 of valve housing 42. Flow valve 40 further comprises annular flange 46 adjacent second end 43 of valve housing 42. Flange 46 provides a circumferential, angled bearing surface 48 for mating fluid coupling 30 with flow valve 40.

Valve means 60 comprising, for example, a poppet valve 64 may be positioned within valve housing 42 for regulating the flow of fuel between tanker 18 and fuel storage terminal 14. Valve housing 42 further comprises a flange portion 70 at first end 41 extending radially outwardly from valve housing 42 which is adapted for securing fill pipe 16 to flow valve 40 in semi-permanent fashion. Flange portion 70 comprises a predetermined symmetric pattern of longitudinal holes which are coaxial with a matching pattern of holes in flange portion 76 of fill pipe 16. Fastening means 72 secure flow valve 40 to fill pipe 16. Although fastening means 72 may comprise any means for securing flange portion 70 to flange potion 76, fastening means 72 preferably comprise threaded bolts 76. A gasket (not shown) may be placed between flange portion 70 and flange portion 76 to prevent fuel passing between flow valve 40 and fill pipe 16 from leaking at the connection.

Fluid coupling 30 comprises a first end 31 and a second end 33. Fluid coupling 30 is of the type which comprises a generally cylindrical, hollow body 32 open at both ends of fluid coupling 30. First end 31 of fluid coupling 30 comprises a flange portion 34 which is secured to fuel transfer hose 12 at free end 13 in the same manner (previously described) as flow valve 40 is secured to file pipe 16. Poppet valve means 35 may be positioned within hollow body 32 for regulating the flow of fuel between tanker 18 and fuel storage terminal 14.

As seen most clearly in FIG. 3B, fluid coupling 30 is joined to flow valve 40 at second end 33 by circumferential locking latches 36. In the embodiment shown in FIGS. 3A and 3B, fluid coupling 30 is a standard American Petroleum Institute (API) coupler well known in the art and does not form a part of the present invention. However, fluid coupling 30 may comprise any coupling means known to the art which can be repeatedly connected and disconnected from flow valve 40, and which mates with flange 46 at predetermined locations around the circumference of the flange.

Fluid coupling 30 has an opening 37 at second end 33. Within opening 37, stainless steel locking latches 36 are fixed to the interior surface 38 of hollow body 32. Latches 36 are spring-loaded and rotate about pins (not shown) to allow the latches to pass over the top of flange 46 of flow valve 40. A sleeve 39 on the outside of Hollow body 32 is longitudinally slidable. Thus, when sleeve 39 is moved in the direction of flow valve 40 over hollow body 32 and flange 46, latches 36 grip bearing surface 48 on flange 46. In the embodiment shown, latches 36 grip bearing surface 48 at three discrete locations around the circumference of flange 46. Because the orientation of flow valve 40 relative to fluid coupling 30 is fixed, latches 36 grip bearing surface 48 at the same three locations each time flow valve 40 and fluid coupling 30 are connected. After repeated connecting and disconnecting, bearing surface 48 on flange 46 becomes worn and a leak or a sudden disconnect can occur. According to the present invention, however, flange 46 can be repositioned to present an unworn portion of bearing surface 48 to latches 36 and thereby distribute wear on flange 46 and extend the life of flow valve 40.

Figure 4:
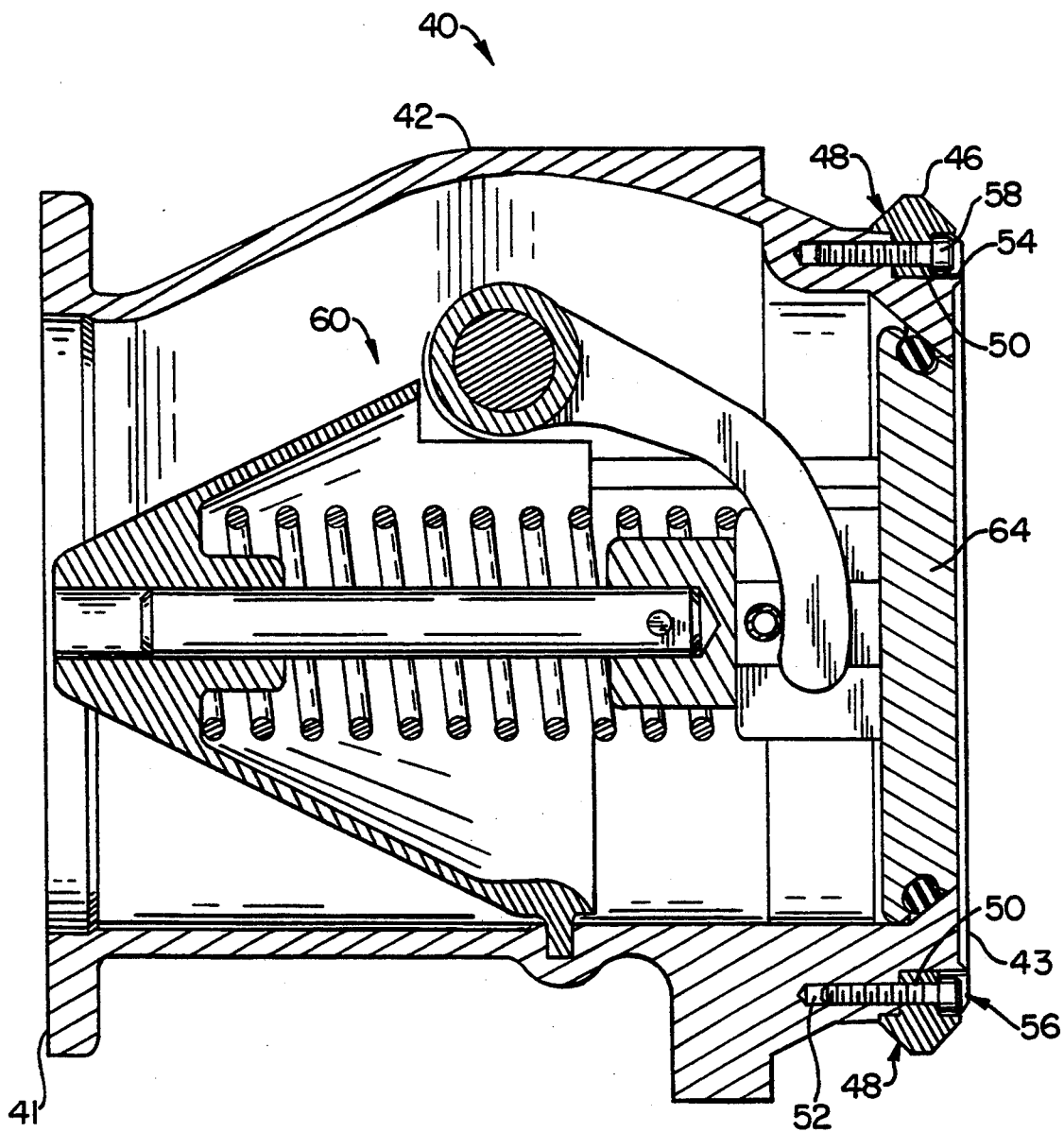
FIG. 4 is a longitudinal sectional view of a preferred embodiment of the flow valve of the invention.

In the preferred embodiment of the invention shown in FIG. 4, flange 46 comprises a predetermined symmetric pattern of longitudinal holes 50 around the circumference of the flange. Valve housing 42 comprises a matching pattern of coaxial threaded recesses 52 adjacent second end 43. Preferably, flange 46 comprises a symmetric pattern of eight holes 50, and valve housing 42 comprises a corresponding pattern of eight threaded recesses 59. Valve housing 42 further comprises a notched portion 54 adjacent second end 43 for receiving flange 46. Flange 46 is mounted to valve housing 42 by releasable flange mounting means 56. Flange mounting means 56 may comprise any means for releasably mounting flange 46 to valve housing 42, but preferably comprise threaded bolts 58. After repeated connecting and disconnecting of flow valve 40 and fluid coupling 30, bolts 58 are removed from threaded recesses 52 and annular flange 46 is rotated until holes 50 are again coaxial with threaded recesses 52 such that flange 46 presents an unworn bearing surface 48 to latches 36 so as to extend the life of flow valve 40. Flange 46 may also be symmetric such that an identical bearing surface 48 is provided on both sides of flange 46. Thus, flange 46 is reversible to further distribute wear and extend the life of flow valve 40.

Figure 5:
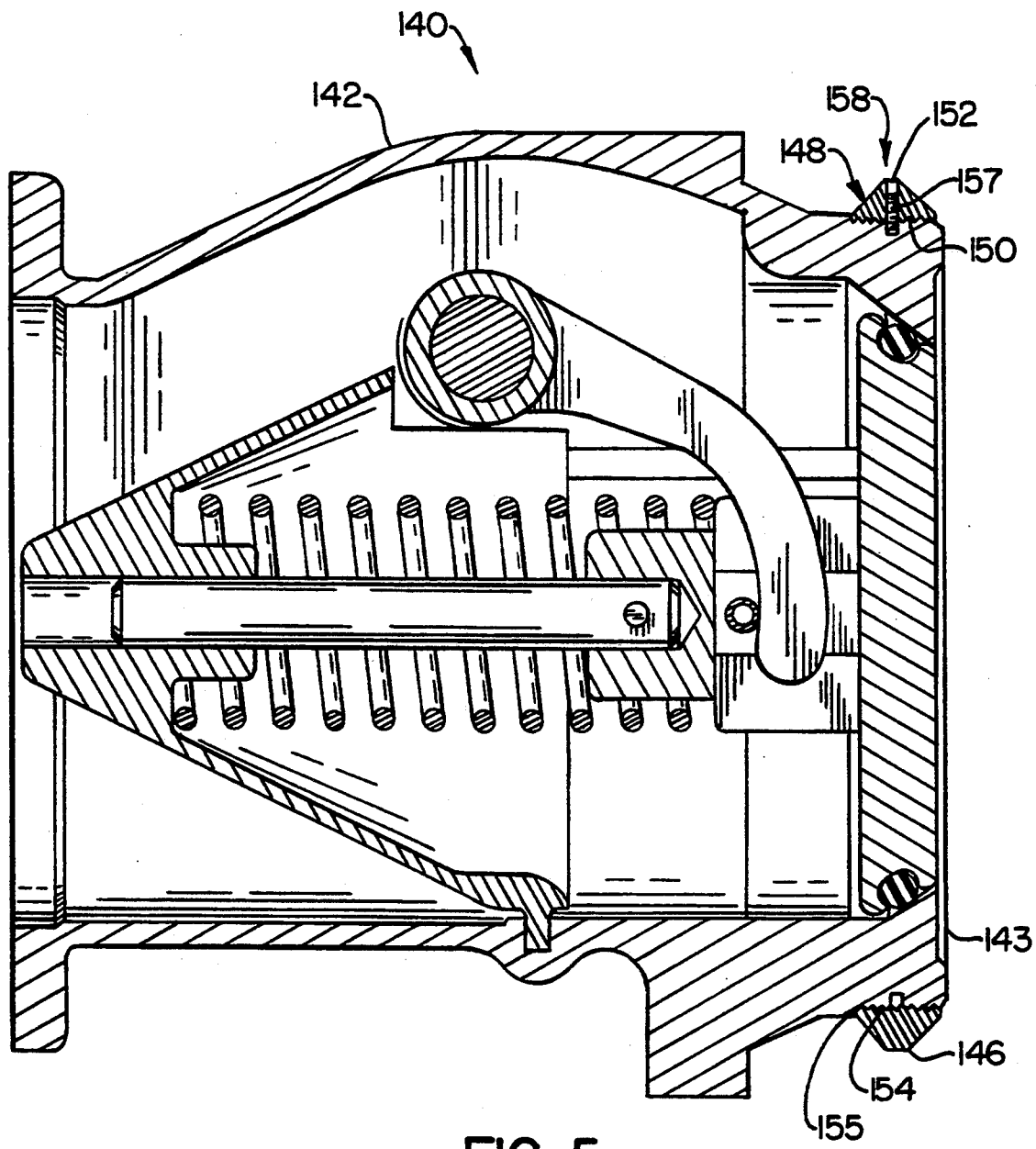
FIG. 5 is a longitudinal sectional view of another preferred embodiment of the flow valve of the invention.
Figure 6:
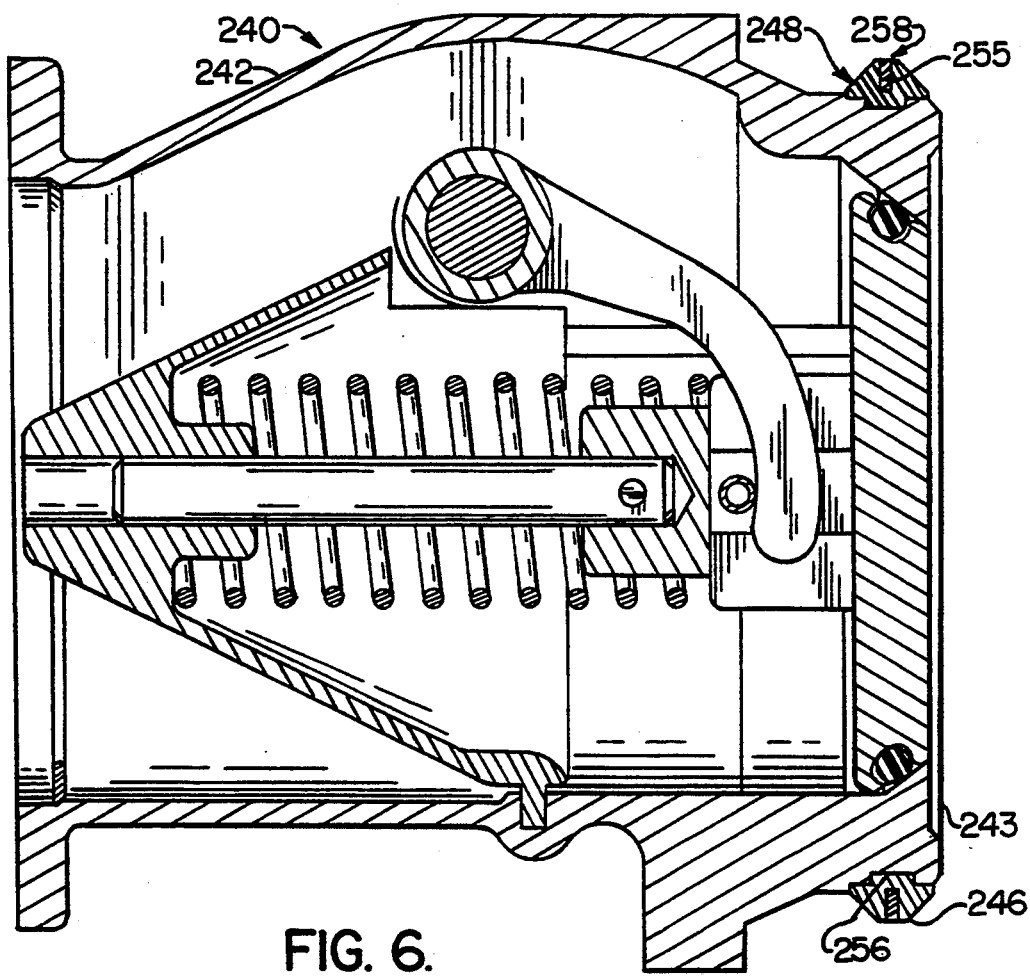
FIG. 6 is a longitudinal sectional view of another preferred embodiment of the flow valve of the invention.
Figure 7A:
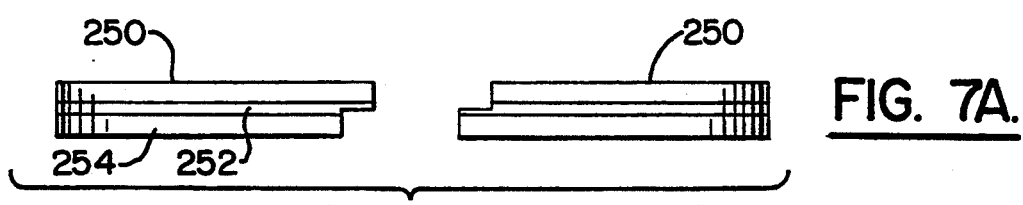
FIG. 7A is an exploded top view of the annular flange of the flow valve of FIG. 6.
Figure 7B:
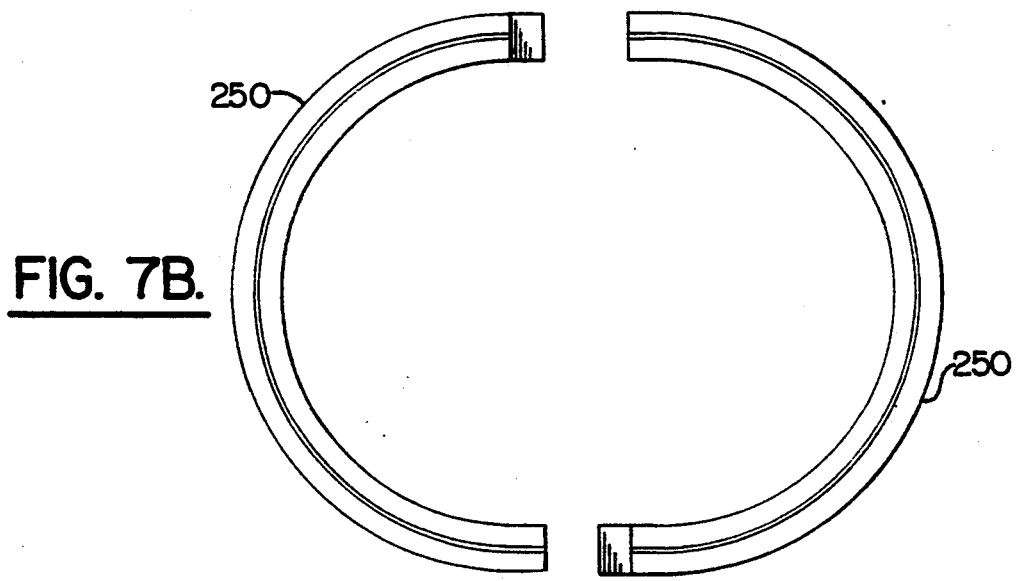
FIG. 7B is an exploded side view of the annular flange of the flow valve of FIG. 6.

In the preferred embodiment of the invention shown in FIG. 5, flange 146 is threaded on inner surface 150 and has a radial hole 159.. Valve housing 142 comprises matching threads 154 adjacent second end 143 for engaging the threads on inner surface 150 of flange 146. Valve housing 142 further comprises a circumferential channel 156 centrally located on threaded portion 154 adjacent second end 143 for receiving releasable flange mounting means 158. Flange mounting means 158 may comprise any means for releasably mounting flange 146 to valve housing 142 and retaining flange 146 in rotational relation with valve housing 142, but preferably comprise threaded set screw 157. After repeated connecting and disconnecting of flow valve 40 and fluid coupling 30, set screw 157 is removed from hole 152 and annular flange 146 is rotated such that flange 146 presents an unworn bearing surface 148 to latches 36 so as to extend the life of flow valve 40. Preferably, annular flange 146 is rotatable up to one full rotation before flange 146 engages shoulder 155 adjacent second end 143 of valve housing 142. Set screw 157 is then replaced in hole 152 to retain flange 146 in rotational relation relative to valve housing 142. Flange 146 may also be symmetric such that an identical bearing surface 148 is provided on both sides of flange 146. Thus, flange 146 is reversible and can be threaded onto valve housing 142 in reverse direction to further distribute wear and extend the life of flow valve 40. In the preferred embodiment shown in FIGS. 6, 7A, and 7B, annular flange 246 comprises a plurality of arcuate-shaped circumferential portions 250. Circumferential portions 250 comprise centrally located circumferential channels 252 in outer surfaces 254. Valve housing 242 comprises a circumferential channel 256 adjacent second end 243. Circumferential portions 250 are positioned in channel 256 such that channels 252 form a continuous circumferential channel 255 extending around the outer surface of flange 246. Releasable flange mounting means 258 positioned within channel 255 of flange 246 secure circumferential portions 250 to valve housing 242, while at the same time channel 256 retains flange 246 in axial relation to valve housing 242. Flange mounting means 258 may comprise any means for releasably mounting flange 246 to valve housing 242, but preferably comprise a spiral lock ring (not shown). After repeated connecting and disconnecting of flow valve 40 and fluid coupling 30, annular flange 246 is rotated relative to valve housing 242 such that flange 246 presents an unworn bearing surface 248 to latches 36 so as to extend the life of flow valve 40. Flange 246 may also be symmetric such that an identical bearing surface 248 is provided on both sides of flange 246. Thus, flange 246 is reversible to further distribute wear and extend the life of flow valve 40.

Figure 8:
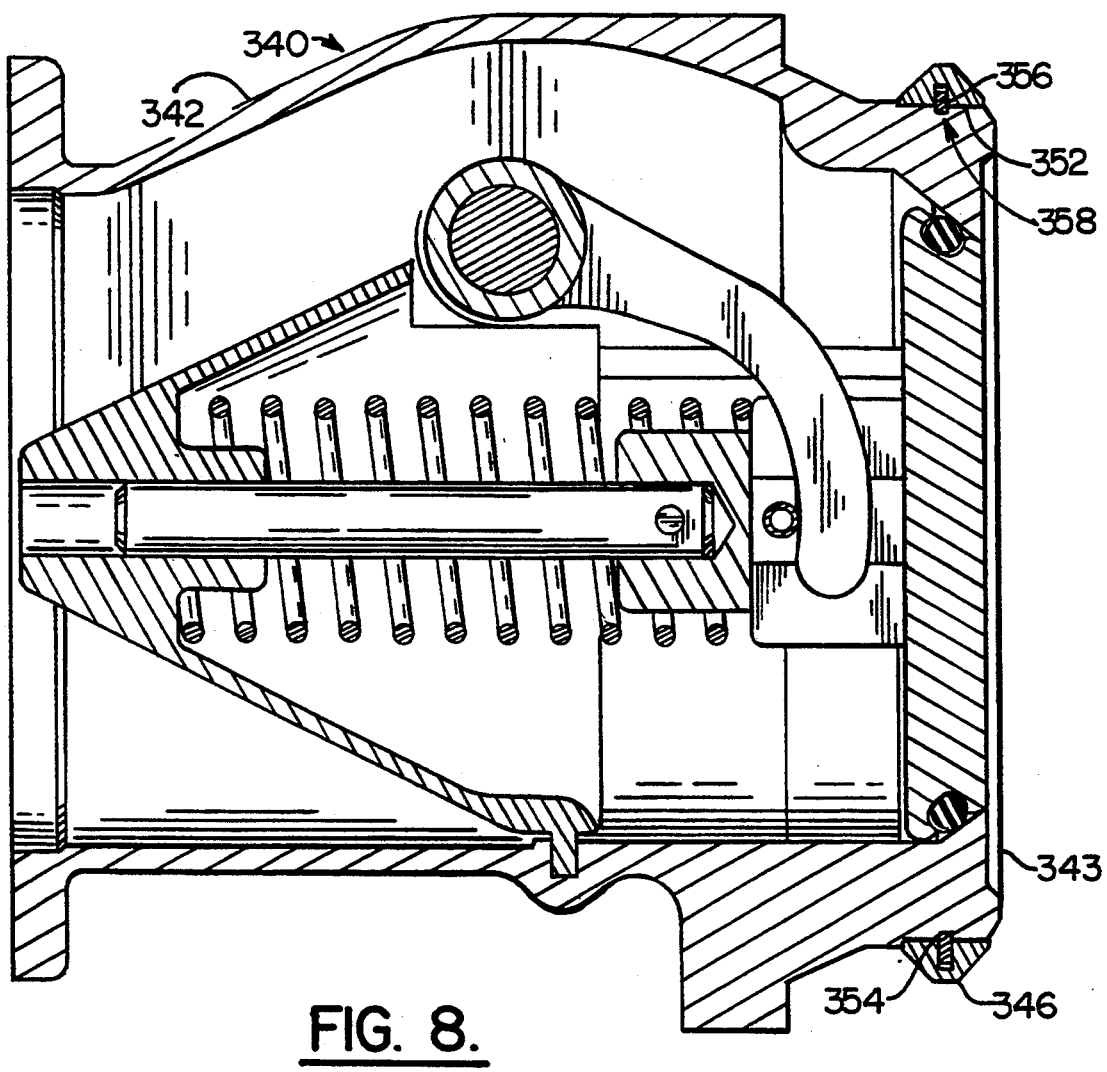
FIG. 8 is a longitudinal sectional view of another preferred embodiment of the flow valve of the invention.
Figure 9:
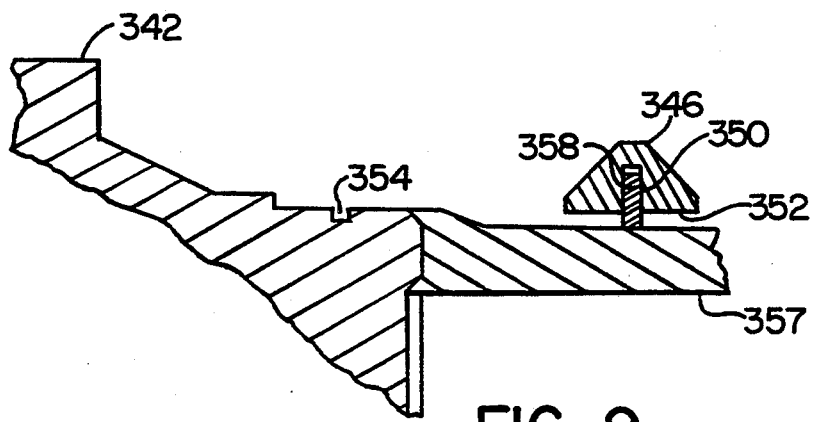
FIG. 9 is a detailed sectional view showing the annular flange mounted to the valve housing of the flow valve of FIG. 8.

In the preferred embodiment of the invention shown in FIGS. 8 and 9, annular flange 346 comprises a centrally located circumferential channel 350 on inner surface 352. Valve housing 342 comprises a matching circumferential channel 354 adjacent second end 343. Permanent flange mounting means 358 are positioned within common channel 356 formed by channel 350 in flange 346 and channel 354 in valve housing 342 using special ramp tool 357 as shown in FIG. 9. Flange mounting means 358 positioned in channel 350 in flange 346 is placed over tool 357 and moved in the direction of valve housing 342 until flange mounting means 358 engages channel 354 in valve housing 342. Permanent flange mounting means 358 thereby secure flange 346 to valve housing 342 while at the same time retaining flange 346 in axial relation to valve housing 342. Flange mounting means 358 may comprise any means for permanently mounting flange 346 to valve housing 342, but preferably comprise a spiral lock ring (not shown). After repeated connecting and disconnecting of flow valve 40 and fluid coupling 30, annular flange 346 is rotated relative to valve housing 342 such that flange 346 presents an unworn bearing surface 348 to latches 36 so as to extend the life of flow valve 40. Flange 346 is mounted to valve housing 342 such that flange 346 is not removable, and thus is not reversible to further distribute wear.

Obviously, many alternative configurations and modifications of the invention are within the ordinary skill of those skilled in the art. It is to be understood that the present invention is not intended to be limited to the proceeding description of preferred embodiments, but rather is intended to encompass all embodiments within the spirit and scope of the invention disclosed and claimed herein.

That which is claimed is:

1. A flow valve for mating with a fluid coupling of the type comprising a cylindrical body and a plurality of circumferentially spaced latches at an end thereof, said flow valve comprising:

a generally cylindrical body having opposing ends and a predetermined pattern of circumferentially spaced openings therein adjacent a first end thereof;

valve means positioned within said body for controlling flow of fluid through said body;

a generally annular flange surrounding the first end of said body for receiving the circumferentially spaced latches from the fluid coupling, said flange having a predetermined pattern of circumferentially spaced openings therethrough corresponding to and aligned with the predetermined pattern of circumferentially spaced openings in said body; and a respective fastener in each of the aligned openings of said body and said flange for releasably mounting said flange to said body to facilitate rotational repositioning of said flange so as to distribute wear on said flange caused by the circumferentially spaced latches of the fluid coupling.

2. A flow valve for mating with a fluid coupling of the type comprising a cylindrical body and a plurality of circumferentially spaced latches at an end thereof, said flow valve comprising:

a generally cylindrical body having opposing ends, said body comprising a continuous circumferential channel adjacent an end;

valve means positioned within said body for controlling flow of fluid through said body;

a generally annular flange for receiving the circumferentially spaced latches of the fluid coupling, said flange comprising a continuous circumferential channel on the interior surface of said flange; and a spiral lock ring positioned partially in said continuous channel in said flange and partially in said continuous channel in said body for mounting said flange to said body to facilitate rotational repositioning of said flange so as to distribute wear on said flange caused by the circumferentially spaced latches of the fluid coupling.

3. A flow valve for mating with a fluid coupling of the type comprising a cylindrical body and a plurality of circumferentially spaced latches at an end thereof, said flow valve comprising:

a generally cylindrical body having opposing ends and a continuous circumferential channel adjacent a first end thereof;

valve means positioned within said body for controlling flow of fluid through said body;

a generally annular flange surrounding the first end of said body for receiving the circumferentially spaced latches from the fluid coupling; said flange comprising a plurality of circumferential portions received in the continuous circumferential channel adjacent the first end of the body, each of said plurality of circumferential portions having a circumferential channel therein so as to define a continuous circumferential channel; and a locking ring received in the continuous circumferential channel of said flange for mounting said flange to said body to facilitate rotational repositioning of said flange so as to distribute wear on said flange caused by the circumferentially spaced latches of the fluid coupling.

4. A flow valve according to claim 3 wherein said flange is symmetric to facilitate reversible repositioning of said flange so as to distribute wear on said flange caused by the circumferentially spaced latches of the fluid coupling.

5. A flow valve according to claim 3 wherein said locking ring comprises a spiral lock ring.

6. A flow valve for mating with a fluid coupling of the type comprising a cylindrical body and a plurality of circumferentially spaced latches at an end thereof, said flow valve comprising:

a generally cylindrical body having opposing ends and a continuous circumferential channel adjacent a first end thereof;

valve means positioned within said body for controlling flow of fluid through said body;

a generally annular flange surrounding the first end of said body for receiving the circumferentially spaced latches from the fluid coupling, said flange comprising a continuous circumferential channel opposite to and aligned with the continuous circumferential channel adjacent the first end of said body; and a locking ring for mounting said flange to said body to facilitate rotational repositioning of said flange so as to distribute wear on said flange caused by the circumferentially spaced latches of the fluid coupling, a portion of said locking ring received in the continuous circumferential channel of said flange and a portion of said locking ring received in the continuous circumferential channel of said body.

7. A flow valve according to claim 6 wherein said locking ring comprises a spiral lock ring.

8. A flow valve for mating with a fluid coupling of the type comprising a cylindrical body and a plurality of circumferentially spaced latches at an end thereof, said flow valve comprising:

a generally cylindrical body having opposing ends, said body comprising a circumferential channel adjacent an end;

valve means positioned within said body for controlling flow of fluid through said body;

a generally annular flange for receiving the circumferentially spaced latches of the fluid coupling, said flange comprising a plurality of circumferential portions having a circumferential channel therein so as to define a continuous circumferential channel in said flange; and a spiral lock ring positioned in said continuous channel in said flange for mounting said flange to said body to facilitate rotational repositioning of said flange so as to distribute wear on said flange caused by the circumferentially spaced latches of the fluid coupling.

9. A flow valve for mating with a fluid coupling of the type comprising a cylindrical body and a plurality of circumferentially spaced latches at an end thereof, said flow valve comprising:

a generally cylindrical body having opposing ends, a reduced diameter end portion adjacent a first end thereof, and a predetermined pattern of longitudinal openings therein adjacent the first end;

valve means positioned within said body for controlling flow of fluid through said body;

a generally annular flange surrounding the reduced diameter end portion adjacent the first end of said body for receiving the circumferentially spaced latches of the fluid coupling, said flange having a predetermined pattern of longitudinal openings therethrough corresponding to and aligned with the predetermined pattern of longitudinal openings in said body; and a respective fastener in each of the aligned openings of said body and said flange for releasably mounting said flange to said body to facilitate rotational repositioning of said flange so as to distribute wear on said flange caused by the circumferentially spaced latches of the fluid coupling.

* * * * *

UNITED STATES PATENT AND TRADEMARK OFFICE
CERTIFICATE OF CORRECTION

PATENT NO.    :   5,407,175
DATED         :   April 18, 1995
INVENTOR(S)   :   Roberts et al.

It is certified that error appears in the above-identified patent and that said Letters Patent is hereby corrected as shown below:

Column 1, line 2, "juoining" should be -- joining --;

Column 6, line 33, "potion" should be -- portion --;

Column 6, line 45, "file" should be -- fill --;

Column 6, line 66, "Hollow" should be -- hollow --;

Column 7, line 23, "59" should be -- 52 --;

Column 7, line 42, "15.9" should be -- 152 --;

Column 8, line 58, "proceeding" should be -- preceding --;

Column 6, line 34, "76" should be -- 78 --; and

Figure 3A, right-hand side, "76" should be -- 78 --.

Signed and Sealed this

Twenty-fourth Day of October, 1995

Attest:

BRUCE LEHMAN

Attesting Officer    Commissioner of Patents and Trademarks